United States Patent

[11] 3,579,858

[72] Inventor Itzhak E. Bentov
 Belmont, Mass.
[21] Appl. No. 853,849
[22] Filed Aug. 28, 1969
[45] Patented May 25, 1971
[73] Assignee Medi-Tech Incorporated
 Belmont, Mass.

[54] ANATOMICAL MODEL
 10 Claims, 5 Drawing Figs.
[52] U.S. Cl. .................................................. 35/17
[51] Int. Cl. ..................................................... G09b 23/32
[50] Field of Search .......................................... 35/17, 20, 51, 10

[56] References Cited
 UNITED STATES PATENTS
 2,345,489 3/1944 Lord ............................ 35/17

OTHER REFERENCES
Martin, C. T., " Juno, Symbol of All Women" Published by Board of Trustees, Cleveland Health Museum, Copyright 1952 35/17

*Primary Examiner*—Harland S. Skogquist
*Attorney*—Wolf, Greenfield, Hieken and Sacks ABSTRACT: An anatomical model comprises a simulated main body blood vessel having a predetermined curvature at a portion thereof and is formed of a yieldable plastic material. At least one simulated secondary blood vessel is interconnected with the main body blood vessel at the curved portion. Means mount the model and comprise means for varying the positioning of the secondary blood vessel with respect to the main body blood vessel to correspond with variations caused by aging or abnormalities in naturally occurring blood vessels. Preferably the anatomical model simulates the aorta and attached arteries.

PATENTED MAY 25 1971

INVENTOR
ITZHAK E. BENTOV
BY
*Wolf, Greenfield, Hieken & Sacks*
ATTORNEYS

ANATOMICAL MODEL

BACKGROUND OF THE INVENTION

Many static anatomical models such as human arterial trees are used for educational and other purposes in medicine. In many cases, models of blood vessels are "static," i.e., they are not variable to conform to changes in the simulated blood vessels due to aging and/or abnormalities.

It is an object of this invention to provide an anatomical model which can be varied to simulate variations in living human or animal bodies.

Another object of this invention is to provide an anatomical model in accordance with the preceding object comprises flexible, transparent blood vessels enabling display as well as projection for teaching and demonstration purposes.

SUMMARY OF THE INVENTION

According to the invention, an anatomical model comprises a simulated main body blood vessel having a predetermined curvature at at least one portion thereof and being formed of a yieldable, flexible plastic material. At least one simulated secondary blood vessel is interconnected with the main body blood vessel at the curved portion. A means is provided for mounting the model and comprises means for varying the position of the secondary blood vessel with respect to the main body blood vessel to correspond with variations caused by aging or abnormalities in naturally occurring blood vessels.

In the preferred embodiment, the anatomical model is an arterial tree comprising a simulated model of the aorta and illustrating the arch of the aorta, the innominate artery, the subclavian arteries and the carotid arteries. The arterial tree is preferably mounted on a base by means of detachable, adjustable fittings which allow variation in position of the blood vessels with respect to each other as well as stretching and contorting of the blood vessels to simulate the aging process.

It is a feature of this invention that the model can be of a transparent plastic. The model is highly useful for demonstration purposes in laboratories, schools, hospitals and the like. In addition the model closely simulates the sizing of the human blood vessels and can be used for teaching purposes in radiology departments as an aid in improving catheterization techniques. The model is preferably transparent and preferably detachable from its mounting. Transparency of the model permits a light beam to be passed through it so that the model can be projected onto a screen or other viewing area as a further aid in teaching and demonstrating.

BRIEF DESCRIPTION OF THE DRAWINGS

The above and other advantages, features and objects of the present invention will be better understood from the following specification when read in conjunction with the accompanying drawings in which.

DESCRIPTION OF PREFERRED EMBODIMENTS

Figure 1:
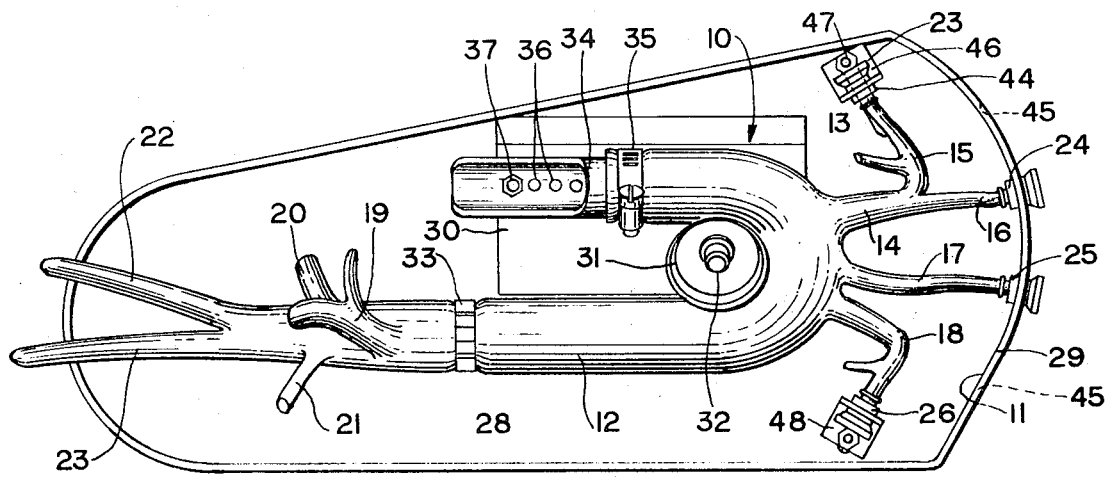
FIG. 1 is a top perspective view of a preferred embodiment thereof.
Figure 2:
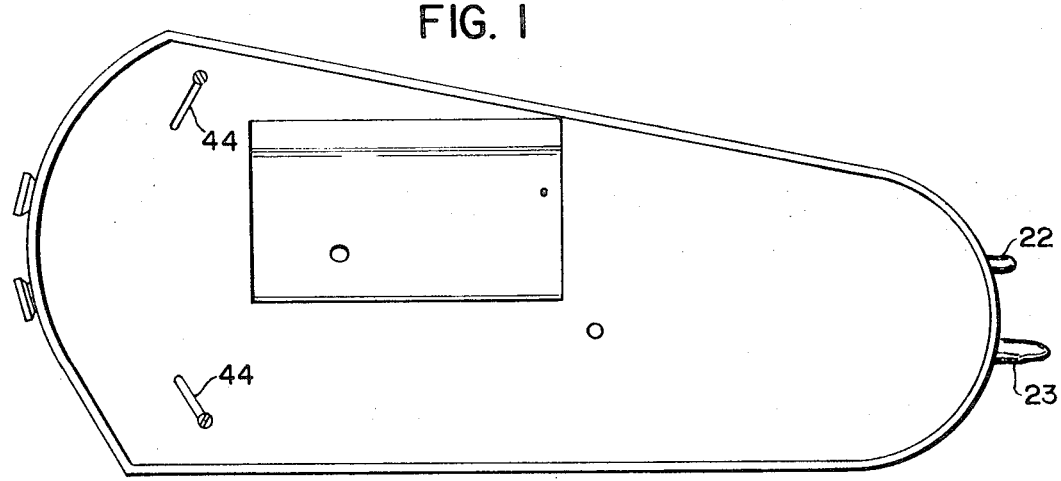
FIG. 2 is a bottom view thereof.

With reference now to the drawings and more particularly FIG. 1, an anatomical model in the form of an arterial tree 10 is illustrated mounted on a mounting plastic shell or base 11. By detachable, adjustable means.

The arterial tree 10 is preferably formed of an integral flexible, yieldable plastic material such as a vinyl plastic which allows for a slight degree of stretching as will be described. The dimensions of the arterial tree closely simulate the dimensions of the human aorta and its attached arteries.

Thus, portion 12 simulates the human aorta which is a main body blood vessel having a portion thereof at 13 with a radius of curvature corresponding to the arch of the aorta. The vinyl plastic is preferably molded with the arch in it although the material is yieldable enough to allow stretching and repositioning as desired. Interconnected with the simulated aorta 12 are simulated natural blood vessels which include the innominate artery 14, the right subclavian artery 15, the right common carotid artery 16, the left common carotid artery 17 and the left subclavian artery 18 all of which join the aorta at the curved portion thereof. At the lower portion of the aorta are the simulated abdominal branches 19 of the aorta and the renal vein and artery 20, 21 with the aorta branching to the common iliac arteries 22 and 23. All of the arteries are tubular as they occur naturally and have opened ends as shown in the drawings. Preferably the subclavian and carotid arteries 15—18 are fitted with detachable, adjustable fittings 23, 24, 25 and 26, all of which are identical and thus only one will be described.

The mounting shell 11 of the preferred embodiment comprises a flat base portion 28 having an upwardly flared rim wall 29 and an upward extension 30 from the flat portion 28. Mounted on the upward extension 30, which is preferably triangular, is a rim 31 permanently affixed to the mounting base by a bolt 32. The rim 31 is useful to provide a desired degree of curvature when the arterial tree is mounted on the mounting shell. Flexible clips such as 33 are used to detachably mount the lower portion of the aorta on the base as shown in FIG. 1.

The end of the aorta which normally joins to the heart in an individual is fitted with a transparent plastic tube 34 clamped to the simulated aorta by a conventional pipe clamp 35. A series of holes 36 are provided to adjust the position of the aorta on the base so that it can be stretched or relieved of stretching forces by means of a nut and bolt arrangement 37 passing through the holes 36 with the nut and bolt arrangement in a fixed position on the raised portion 30.

Figure 3:
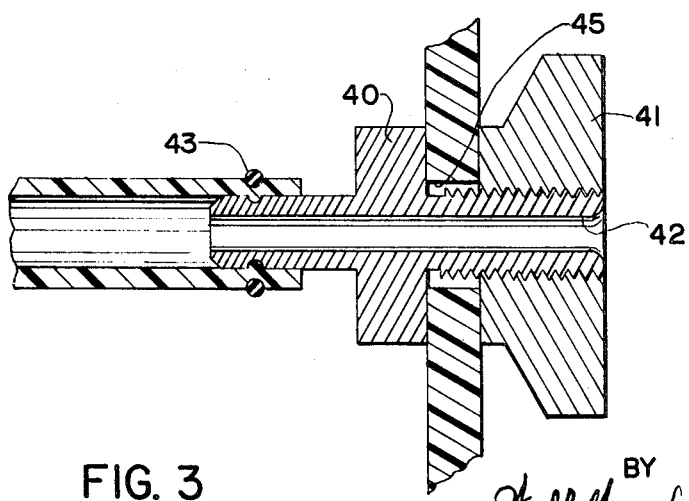
FIG. 3 is a cross-sectional view through a portion of FIG. 1.

The fittings 23—26 act as mounting means in conjunction with the mounting shell to provide for adjustment in positioning and elongation of the blood vessels. Each fitting such as 24, best shown in FIG. 3, comprises a metal stem 40 and a lock nut 41 with a hollow tubular portion 42. An extension of the stem is clamped to the blood vessel end as by a tight O-ring 43. The mounting shell is provided with a series of slots 44, 45 which provide for adjustment.

Fittings 24 and 25 are mounted directly on slot 45 by use of the lock nut. Fittings 23 and 26 are mounted on L-shaped plastic brackets 46, 47 which is in turn mounted in the slots 44 by conventional bolts 47 for adjustable movement. Bracket 48 is identical to bracket 46 and is mounted in a similar slot 44.

In use of the anatomical model, the arterial tree is normally positioned as shown in FIG. 1 simulating the position of a healthy aorta and integral blood vessels in the body of a human. This permits demonstration of the healthy condition of the aorta. Demonstration of catheterization techniques can also be made since the plastic material is transparent. A catheter end can be introduced for example through the iliac arteries and passed up to the carotid arteries as desired with the catheter showing through the transparent artery. To simulate the aging process in the body, lock nuts 41 of the arteries 16 and 17 are loosened and moved to a down position as shown in FIG. 1. This stretches the innominate artery and the carotid arteries and moves their position with respect to the aorta closely simulating the position in for example a 50-year old human as compared to the original position which simulates the arterial tree of a 20-year old human. Because of the adjustment possible through all of the fittings, other malformations, malfunctions or aging changes can also be simulated.

In order to demonstrate the arterial tree even further, the lock nuts holding the model 10 to the mounting can be removed and the entire model raised and exhibited without the base if desired. Because the sizes of the passageways within the blood vessels are dimensioned to closely simulate actual dimensions, fluid flow and catheterization techniques can be closely simulated.

Figure 4:
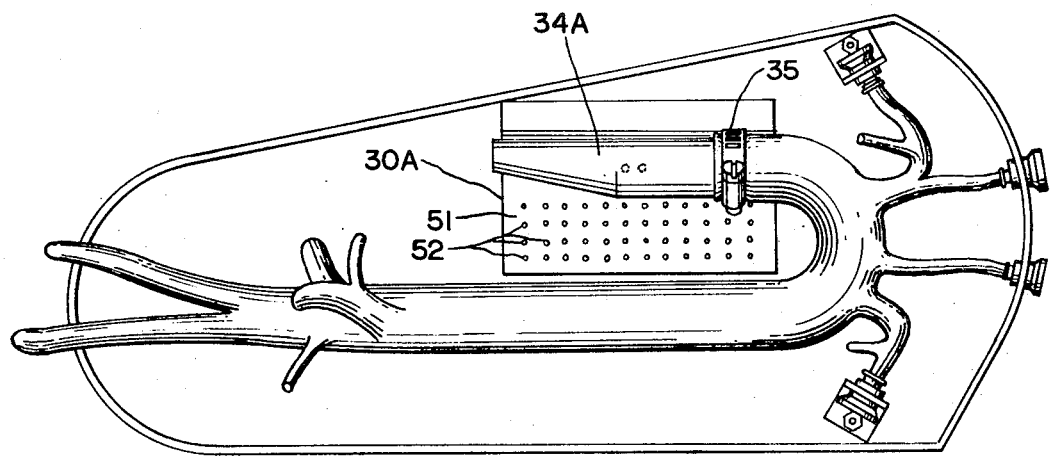
FIG. 4 is a top view of an alternate embodiment thereof.
Figure 5:
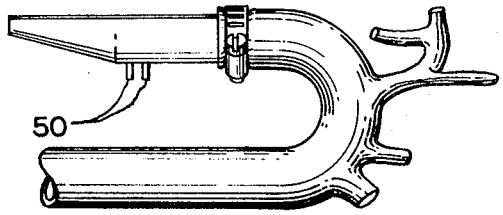
FIG. 5 is a perspective view of an element of the alternate embodiment.

In an alternate embodiment of this invention shown in FIGS. 4 and 5 all parts of the embodiment of FIG. 1 are identical except that the rim 31 is eliminated and the upward extension 30 and hard transparent tube 34, are modified as shown at 30A and 34A. In this embodiment the transparent plastic tube 34A is provided with two downwardly depending mounting pins 50. A flat wall 51 of extension 30A has a series of holes 52 spaced to accept the pins 50 in various positions. Thus the pins 50 act as pegs with the flat wall 51 acting as a peg board. The aortic arch can be simulated in various stretched positions by mounting the pegs in different pairs of holes 52 as desired.

While specific embodiments of this invention have been shown and described, many variations thereof are possible. For example, the adjustable fittings can be of other designs to allow detachment and/or movement and clamping when desired. Individual slots can be used for each of the fittings rather than a common slot, for fittings 24 and 25 as shown at 45. The specific means 33 for clamping the lower part of the aorta to the base can vary. Similarly the clamps 35, O-rings 43 and bolts 37 can be varied. In all cases, adjustable fittings are used in conjunction with a blood vessel material which allows stretching, flexing and yielding.

I claim:

1. An anatomical model comprising:
a simulated main body blood vessel having a predetermined curvature at at least one portion thereof and being formed of a yieldable, plastic material;
at least one simulated secondary blood vessel being interconnected with said main body blood vessel at said one portion;
means for mounting said model; and
said mounting means comprising a means for varying the positioning of said secondary blood vessel with respect to said main body blood vessel to correspond with variations caused by aging or abnormalities in naturally occurring blood vessels.

2. An anatomical model in accordance with claim 1 wherein:
said main body blood vessel is a simulated aorta and said portion having a curvature is the aortic arch;
said means for mounting comprising a base; and
said means for varying the positioning of said secondary blood vessel comprising a fitting at the end of said secondary blood vessel.

3. An anatomical model in accordance with claim 2 wherein said base carries means for releasably engaging said fitting and for permitting movement of said fitting with respect to said aorta whereby stretching and repositioning of said secondary blood vessel with respect to said aorta can be accomplished.

4. An anatomical model in accordance with claim 3 wherein said model is an arterial tree comprising said aorta, an attached simulated innominate artery, left subclavian artery, right common carotid artery, left common carotid artery, and right subclavian artery.

5. An anatomical model in accordance with claim 3 and further comprising rim means and attachment means mounted on said base for releasably attaching said aorta to said base with a proper degree of curvature at said aortic arch.

6. An anatomical model in accordance with claim 5 wherein said releasably engaging means comprises a slot defined by said base.

7. An anatomical model in accordance with claim 4 wherein said base defines a raised extension for mounting one end of said aorta.

8. An anatomical model in accordance with claim 7 wherein said plastic material is transparent and said releasably engaging means comprises a slot defined by said base.

9. An anatomical model in accordance with claim 7 wherein said raised extension defines a surface defining a series of peg board holes,
said one end of said aorta carrying pins for cooperating with said holes to position said aorta in desired positions and configurations thereof.

10. An anatomical model in accordance with claim 8 wherein each of said simulated arteries are open ended and said entire arterial tree is releasably mounted on said base.